(No Model.)

E. WESTON.
APPARATUS FOR RETARDING OR DAMPENING THE MOTION OF MOVING BODIES IN ELECTRICAL INSTRUMENTS.

No. 480,889. Patented Aug. 16, 1892.

WITNESSES:
Gustave Dieterich
M. Bosch

INVENTOR
Edward Weston
BY Park Benjamin
his ATTORNEY.

UNITED STATES PATENT OFFICE.

EDWARD WESTON, OF NEWARK, NEW JERSEY.

APPARATUS FOR RETARDING OR DAMPENING THE MOTION OF MOVING BODIES IN ELECTRICAL INSTRUMENTS.

SPECIFICATION forming part of Letters Patent No. 480,889, dated August 16, 1892.

Application filed March 11, 1891. Serial No. 384,652. (No model.)

*To all whom it may concern:*

Be it known that I, EDWARD WESTON, of Newark, Essex county, New Jersey, have invented a new and useful Improvement in Apparatus for Retarding or Dampening the Motion of Moving Bodies in Electrical Instruments, of which the following is a specification.

My invention relates to a device for retarding or arresting the motion of the indicating mechanism in an electrical measuring-instrument; and it consists, in combination with said mechanism, of a closed conductor in coil or loop form receiving motion from said mechanism and disposed in a field of force.

Figure 1:
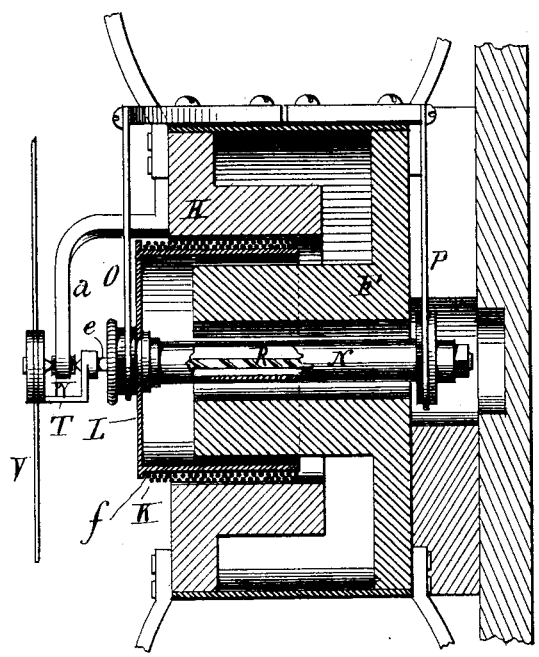
Figure 2:
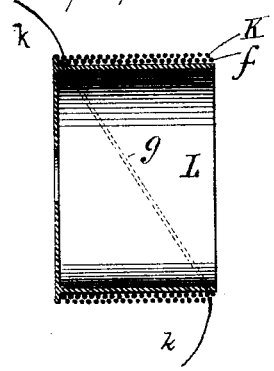

In the accompanying drawings, Figure 1 is a section showing my said apparatus applied to an electrical measuring or indicating instrument hitherto devised by me. Fig. 2 is a transverse section of the movable support or cylinder and the two coils carried thereon.

Similar letters of reference indicate like parts.

The instrument to which my invention is here shown applied is of the general type of electrical measuring or indicating instruments patented to me on the 17th day of February, 1891, by United States Letters Patent No. 446,493.

F and H are the tubular pole-pieces of a permanent magnet, the pole-piece F being arranged within the pole-piece H, so that there is an annular space between them. This space is a strong magnetic field.

L is a cylinder of light metal or paper, which is supported upon the tube N, which extends through the tubular pole-piece F. The tube N is carried by two leaf-springs O and P. Within the tube N and secured to the extremity thereof nearest the spring P is a spiral spring R, the free end of which is fastened to the short rod or shaft $e$. Said shaft is secured to a yoke T, which is supported by pivot-pins in the block W, which is carried by bracket $a$. The outer arm of the yoke T carries the index-needle V. The arrangement of the internal spring R, the yoke T, bracket $a$, and block W, together with the spring-supported cylinder L, is the same as is illustrated in my prior patent before referred to, and therefore needs no further description. In said prior patent the cylinder (here marked L) is shown carrying a single coil, which is here marked K and is the outer of the two coils represented. The terminals $k$ of this coil are shown in Fig. 2 and communicate in any suitable way with the binding-posts of the instrument. Through this coil the current which controls the instrument passes, and by the reaction of the field produced by said passage of the current upon the annular magnetic field in which the cylinder L and its coil K are situated the coil and consequently the cylinder are caused to move bodily in an axial direction in said field and to assume a position therein dependent upon difference of potential between terminals of the instrument.

It will be observed that in Fig. 1 I show the pole-pieces H and F as those of a permanent magnet.

It is an important feature of this instrument that a variation in either the electro-motive force or the resistance in the circuit which includes the coil K will cause said coil to move as described and to assume and remain in a new position, which will depend upon the extent of movement of the coil due to the change aforesaid. This capability adapts the instrument to a very large and important variety of uses. The instrument is exceedingly sensitive, the movement of the coil being very small and responding to very slight variations. In order to render the apparatus of greater practical efficiency, it is desirable to dampen or deaden such movement of the coil as is due to its own inertia, so that when a change in the current occurs the coil may at once go to its new position and remain there with the least possible vibration on either side of its final resting place, or, in other words, so that the index-needle controlled by the coil may at once move to the proper indication and remain motionless, or very nearly so. I can diminish the inertia of the parts by making the cylinder L of very light metal, such as aluminium, or preferably of paper. By the use of paper I cheapen the construction and render the cylinder very easily made. In order, however, to produce a direct dampening effect, I have devised an entirely new construction, which is applicable not only in the present instance, but to all cases where a body is caused to move in a field of force. This consists in a second coil or conductor in loop form closed on itself, disposed parallel to the first coil, and supported so as to move coincidently in a field of force with said first coil. In the drawings this coil is shown at $f$ and is wound directly upon the cylinder L and inside the coil K. Its terminals are connected, as indicated by the dotted lines $g$ in Fig. 2, so that the coil $f$ is thus short-circuited. The use of this coil $f$ depends upon the well-known law of Lenz, that in all cases of electro-magnetic induction the induced currents have such a direction that their reaction tends to stop the motion which produces them. In the present case the closed conductor $f$ moves with the cylinder L in the magnetic field, and as a consequence a current is induced in said coil, which tends to stop its motion. While the current in the instrument circulating through the coil K, therefore, is strong enough to move the coil, and hence the cylinder, to the new position and to overcome the counter effect of the induced current in the coil $f$, due to that motion, the strength of the induced current, on the other hand, in the coil $f$, due to vibrations of the cylinder L, produced simply by its own inertia is sufficient to overcome the energy of that motion and so bring the cylinder instantly or very nearly instantly to rest. Of course the coil $f$ is to be proportioned in the manner best adapted to achieve this result, an operation which is within the knowledge of any person skilled in the art.

It will be apparent without further explanation that I have here a very simple and efficient means for deadening the movement of any conductor in a magnetic field which is susceptible to a large number of useful applications. In the present example it is of course not essential that the conductor $g$ should be connected merely at its terminals, inasmuch as short circuit may be made at various points along its length. So, also, it may be disposed outside the coil K as well as inside. Neither is it necessary that the conductor $f$ should be carried on the same support as the coil K, so long as its motion is caused by said coil K. Nor is it essential that it should be in the same magnetic field as the coil K, as it may be located in some other magnetic field and still exercise its retarding effect.

I claim—

1. In an electrical indicating-instrument, two conductors, in coil or loop form, mechanically connected and bodily movable in an axial direction in a field of force, one of said conductors being in electrical circuit and the other short-circuited or closed on itself.

2. In an electrical indicating-instrument, an annular field of force, two concentric conductors mechanically connected and supported therein and movable in an axial direction, one of said conductors being in electrical circuit and the other short-circuited or closed on itself.

3. In an electrical indicating-instrument, an annular field of force, a movable cylinder concentrically disposed therein, and on the periphery of said cylinder two conductors, one of said conductors being in electrical circuit and the other short-circuited or closed on itself.

4. In an electrical indicating-instrument, an annular field of force, a movable cylinder concentrically disposed therein, and on the periphery of said cylinder two coils, one superposed on the other, one of said coils being in electrical circuit and the other short-circuited or closed on itself.

5. In an electrical indicating-instrument, an annular field of force, a movable support of paper concentrically disposed therein, and on the periphery of said support two conductors, one of said conductors being in electrical circuit and the other short-circuited or closed on itself.

EDWARD WESTON.

Witnesses:
R. C. FESSENDEN,
A. F. CONERY, Jr.